United States Patent [19]

Schaltegger

[11] Patent Number: 4,848,479
[45] Date of Patent: Jul. 18, 1989

[54] STRAIGHT LINE CHECKWEIGHER

[75] Inventor: Herbert E. Schaltegger, New Milford, Conn.

[73] Assignee: Preston, Suprenant & Company, Inc., Lincoln, R.I.

[21] Appl. No.: 126,541

[22] Filed: Nov. 30, 1987

Related U.S. Application Data

[63] Continuation-in-part of Ser. No. 38,036, Apr. 13, 1987, which is a continuation-in-part of Ser. No. 893,035, Aug. 1, 1986, Pat. No. 4,657,054, which is a continuation-in-part of Ser. No. 716,680, Mar. 27, 1987, Pat. No. 4,625,775.

[51] Int. Cl.⁴ .......................... G01G 19/00; B65B 1/46
[52] U.S. Cl. ...................... 177/145; 141/83; 53/251
[58] Field of Search .............. 141/83; 53/251; 177/145

[56] References Cited

U.S. PATENT DOCUMENTS

| | | | |
|---|---|---|---|
| 4,010,597 | 3/1977 | Nelson | 53/374 |
| 4,344,493 | 8/1982 | Salmonsen et al. | 177/145 X |
| 4,514,953 | 5/1985 | Patzwahl | 141/167 X |
| 4,578,929 | 4/1986 | Tisma | 53/251 |
| 4,625,775 | 12/1986 | Schaltegger | 141/83 |
| 4,657,054 | 4/1987 | Schaltegger | 141/83 X |

Primary Examiner—George H. Miller, Jr.
Attorney, Agent, or Firm—Nolte, Nolte & Hunter

[57] ABSTRACT

Apparatus for checking the weight of filled containers delivered from a supply conveyor traveling at a predetermined speed and for delivering the weighed pieces to a pick-up conveyor; in which at least one weighing unit provides a guide for receiving a container from the conveyor and for guiding the same to a weigh station at diminishing speeds from the conveyor to the weigh station and a rotatable plow for removing the piece from the weigh station; from a stopped position adjacent the piece at the station at increasing speeds to the pick-up conveyor. The weigh station is disposed intermediate the conveyors and where two units are used, the weigh stations may be positioned along a straight line.

1 Claim, 12 Drawing Sheets

STRAIGHT LINE CHECKWEIGHER

CROSS REFERENCE TO RELATED APPLICATIONS

This is a continuation-in-part of pending application Ser. No. 038,036, filed Apr. 13, 1987 which is a continuation-in-part of application Ser. No. 893,035, filed Aug. 1, 1986 (which issued as U.S. Pat. No. 4,657,054) which is a continuation-in-part of application Ser. No. 716,680, filed Mar. 27, 1985 which issued as U.S. Pat. No. 4,625,775.

These disclosures are incorporated herein by reference.

BACKGROUND OF THE INVENTION

Work pieces, such as containers which have been conveyed at high speed through processing steps such as filling are, by the present invention, conveyed to and from yet another station where they may be weighed, for example.

Checkweighers require only short rest periods for weighing containers since no other operations, such as partial or complete filling of a product is required.

Short rest periods require few load cells so that it is possible to arrange these in a straight line, rather than in the circular pattern required for machines with a larger number of load cells.

A straight line machine in which the load cells are in a straight line requires a unit mechanism for each load cell. Since all units with their respective load cells are supplied containers by the same conveyor, the removal of the containers from the load cells has to be done with another conveyor to avoid interference between incoming and outgoing containers.

This condition limits for all practical purposes a unit to one load cell, but each unit can be equipped with one, two or even three guides.

Since the removal of the containers from the load cell cannot be done with a similar mechanism as is used for the transfer of the containers from the supply conveyor to the load cell, a different mechanism, such a plow, can be used since this transfer does not require great accuracy.

Figure 1:
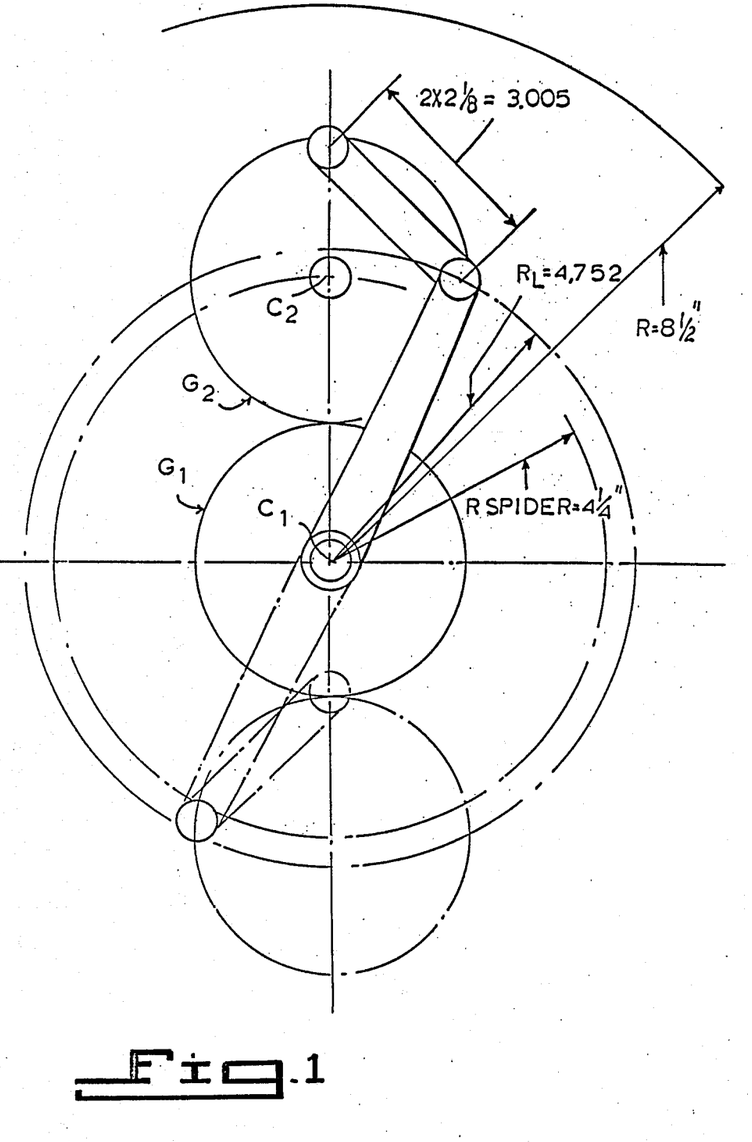
FIG. 1 is a schematic plan view of a unit mechanism minus the container guides.

A straight line machine (the load cells are in a straight line) requires a unit for each load cell (a unit consisting of gears G1 and G2; a spider, etc., as more completely discussed, infra; and see FIG. 1).

Figure 2:
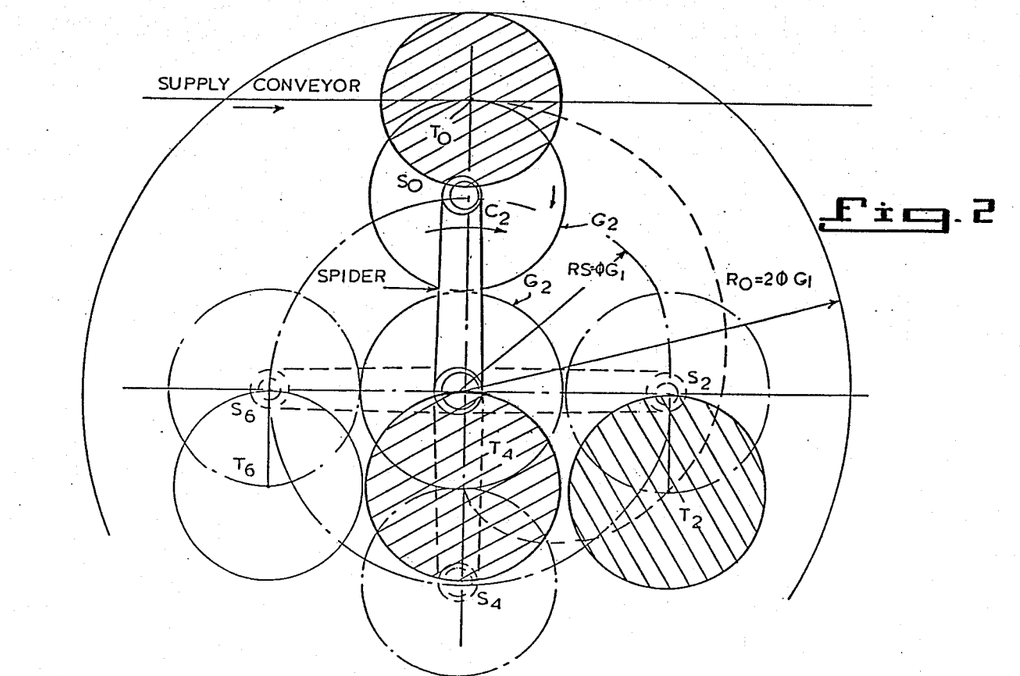
FIG. 2 is a schematic plan view showing the position of containers during placement by the unit.
Figure 3:
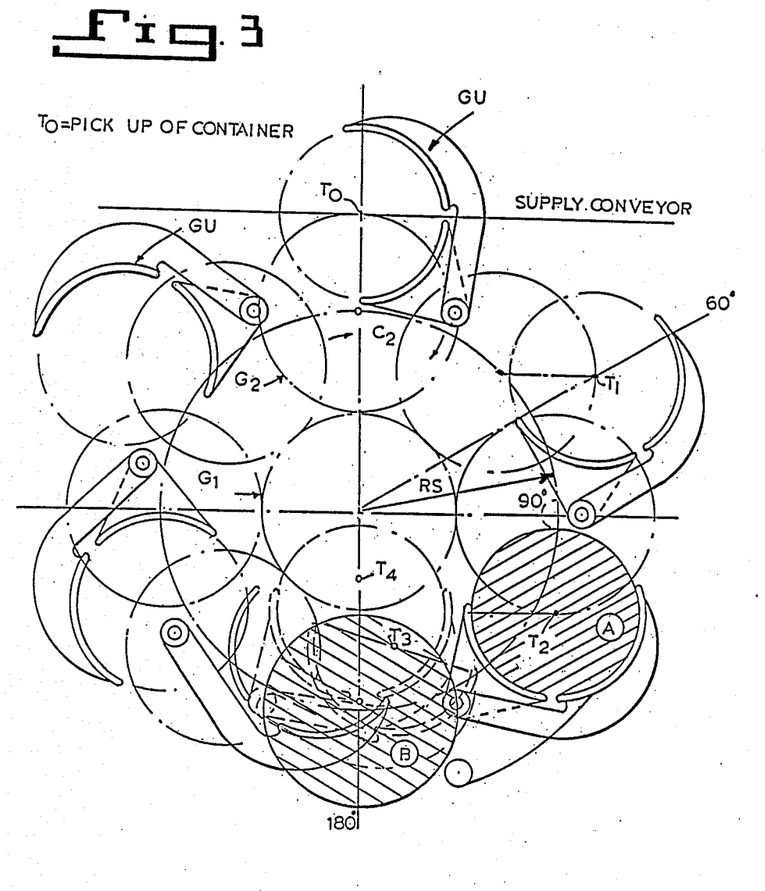
FIGS. 3 and 3B are schematic plan views of a unit mechanism including guides showing the position of the containers and guides during placement of the container by the unit.
Figure 3B:
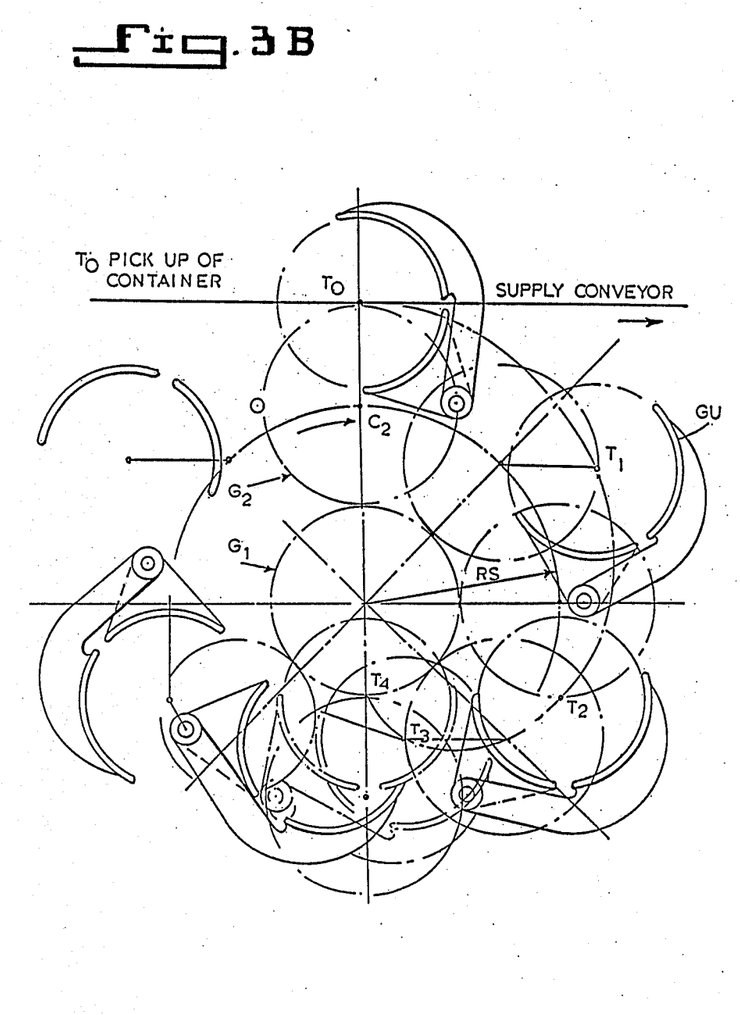
Figure 4:
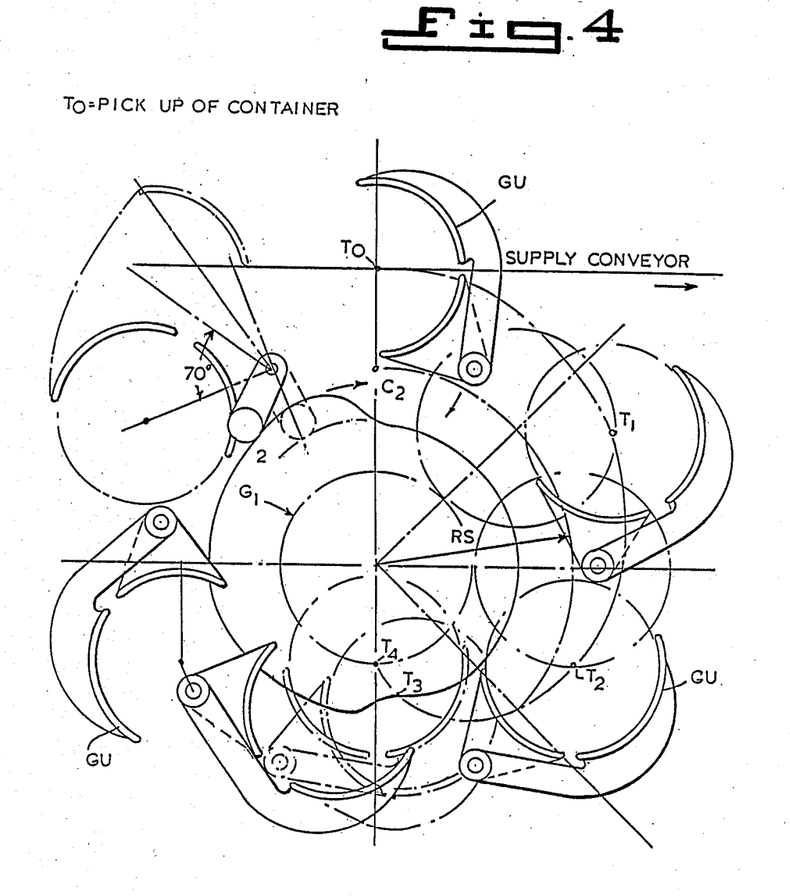
FIG. 4 is a schematic plan view similar to FIG. 3 and including a schematic showing of the lever operating mechanism of the guide.

To determine the available weighing time for load cells which do not require recovery time, the following is considered with reference to FIGS. 2-4.

A. Unit with One Guide

Every container is picked up by its guide from the conveyor at a point marked 0°. After the spider has turned some 90°, the container is already in a position cose to the container which rests on the load cell, so that the removal of this container will have to begin. (This will be the end of the weigh cycle.)

After the spider has turned another 90° to the position of 180°, the new container will be centered over the load cell and, therefore, be released by the guide. After the spider has travelled another 5°, the container will have come to rest over the load cell, so that the weighing cycle can begin.

Total weighing cycle $= 180 - 5 + 90 = 265°$ out of every 360° turn of the spider or 73.6% of the time cycle for any container.

B. Unit with Two Guides

At the moment one guide is at the 180° position where it releases its container, the other guide is picking up a new container from the conveyor. After a turn of 90° by the spider, the container, dropped onto the load cell 90° before, will have to start its removal.

Allowing again 5° turn of the spider to bring a container to rest on the load cell (after dropping it on the load cell), the weigh cycle is equivalent only to an 85° turn of the spider. With a cycle of 180° turn of the spider, the 85° turn is equivalent to 47.2% of the time cycle for any container.

C. Unit with Three Guides

At the moment a guide releases a container over the load cell (position 180°) the next container has already been picked up and travelled 60° by the turn of the spider. 30° later, the container on the load cell will start its removal. Allowing again a 5° turn of the spider to bring a container to rest on the load cell, the weight cycle will only be $30 - 5 = 25°$ by the turn of the spider. Since a turn of 120° by the spider is equivalent to the time cycle of a container, the actual weighing time will be 21% of the time cycle for any container.

The capacity of units with one load cell, which requires 0.25 sec. weighing time, but no recovery time.

A. For Unit with One Guide

Weigh cycle is 73.6% of total cycle. Therefore, total cycle is $0.25/0.736 = 0.34$ sec Capacity $= 60/0.34 = 175$ Cont/min.

B. For Unit with Two Guides

Weigh cycle is 47.2% of total cycle; total cycle is $0.25/0.472 = 0.53$ min.

Capacity $= 60/0.53 = 113$ Cont/min.

C. For Unit with Three Guides

Weigh cycle is 21% of total cycle: total cycle is 0.25/0.21=1.2 sec

Capacity =60/12=50 Cont/min.

In determining the spacing of the containers on the conveyor, it must be considered that since each guide will have to pick up one container for each 360° turn of the spider which drives the guide, while all units have to be built exactly the same, they will also rotate at the same frequency.

Figure 5:
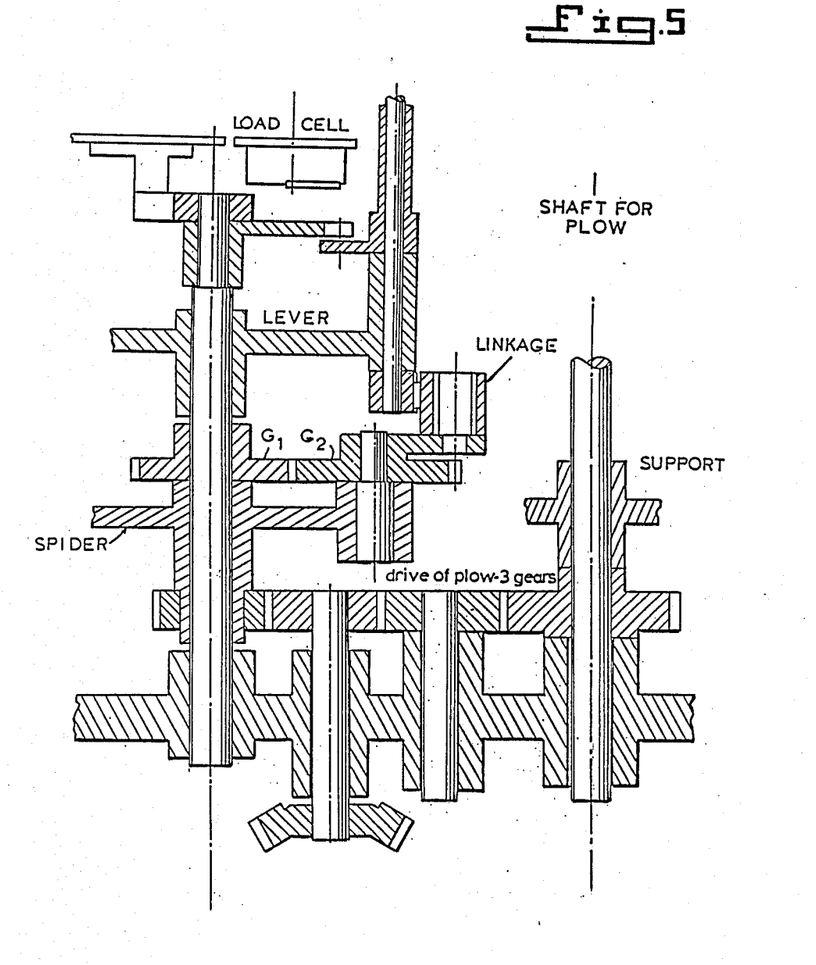
FIG. 5 is a schematic vertical sectional view of a unit provided with two guides and two plows (the plow drive only being shown)

The spacing of the containers on a machine with one unit and this unit with only one guide will be $S=T_{max}=4\times R\times TT$ for each cycle of the spider. $T_{max}$ = maximum travel of a guide, which is twice the travel of the center of gear G2 as it rotates around the stationary gear G1. Please see FIGS. 1 and 5.

For $G1=G2=41/2''$, $T_{max}=4\times 41/4''\times TT=5.3''$ per cycle. The travel of the conveyor on which the container ride, should preferably be somewhat higher, such as about 56" to 58" per cycle.

For a machine with one unit with one guide using 41/4"gears and with a travel of 58" per cycle of the container on the conveyor, the spacing of the containers will also be 58" per cycle.

For a machine with one unit, but with two guides on this unit, the spacing will be 29" per cycle.

For a machine with 2 units and each unit with one guide, the spacing will agin be 29" per cycle.

If these units are built with two guides each, the spacing will then be only 141/2" per cycle.

The spacing of the containers on the conveyor is equal to the travel of the convey which is slightly higher than the maximum travel of a guide, per cycle, divided by total number of guides on all units used for a machine.

Figure 10:
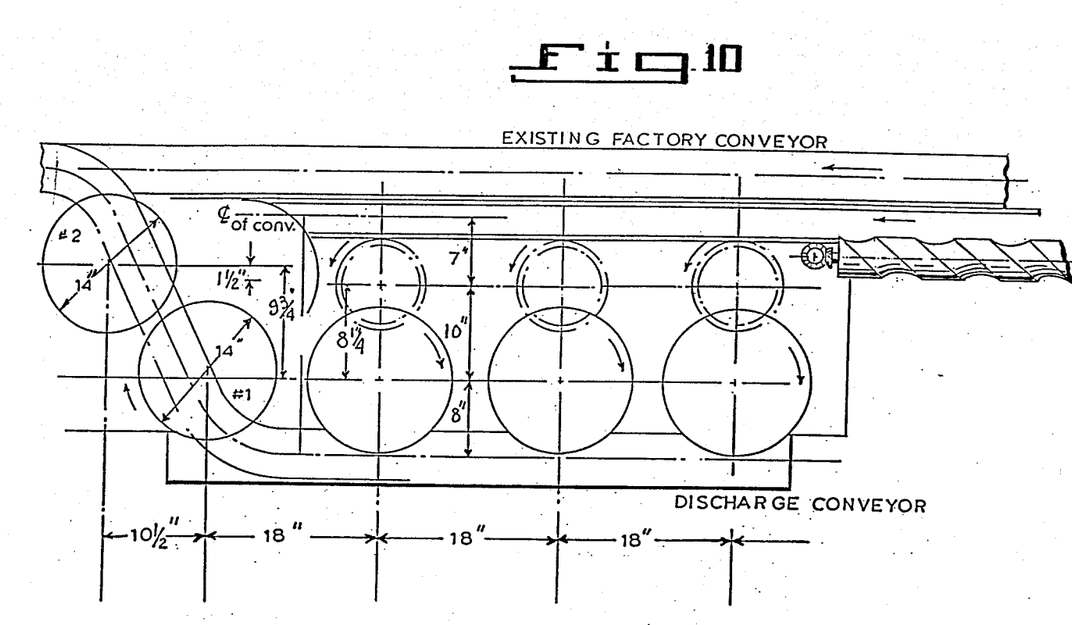
FIG. 10 is a schematic plan view showing the layout of conveyors and units of a three unit machine.

The spacing of the containers is best performed by a spacing screw shown in FIG. 10 (also called a separating or timing screw) which will turn 360° for each released container).

The timing of the units, relative to each other, is adjusted so that each guide picks up its assigned container at the very moment it passes by on the conveyor.

The transfer of the containers from the supply conveyor to the load cell is performed by guides GU in FIGS. 3, 3B and 4 which travel along an epicycloidal curve, as performed by any tooth of a rotating gear G2, which travels around a stationary gear G1. Both gears G1 and G2 are, in the present instance, of equal size.

Preferably, the transfer of the container from the load cell to the discharge conveyor should also be performed by a similar mechanism as is used for their transfer from the supply conveyor to the load cell. This is not possible since with such an arrangement, the load cell cannot be supported at all due to moving parts underneath it and the moving container above it when it is placed onto the load cell and then removed from it again.

It is, therefore, necessary to employ some other means to perform this task.

In the present embodiment, a rotating plow (FIGS. 5, 6, 7, 8 and 9) is used, which comes to a momentary stop prior to its contact with the container resting on the load cell. As the plow starts to rotate, it will push the container off the load cell at an increasing rate of speed, until this speed will be close to that of the discharge conveyor onto which the container will be moved.

The maximum rate of travel of the guide is $4\times D_1 \times TTG1$ for gears G1 and G2 with 41/4" diameter, the maximum rate of travel will be $4\times 41/4\times II/C=53.4''/$cycle.

For a unit which will process 100 container/min., the maximum rate of travel of a guide (at the moment it will pick up a container from the supply conveyor) will, therefore, be 53.4/60×100=89"/sec.

Since the supply conveyor should travel at a somewhat higher speed, to reduce the difficulties which arise from an inaccurate specing of the containers on the conveyor, the rate of travel of this conveyor will be increased from 53.4"/cycle to 60"/cycle. The speed at whch this conveyor will travel will, therefore, be 100"/sec. for a machine, consisting of units with one guide each and operating at 100 rpm per unit.

To reduce this speed, each unit will contain two guides.

The output of a unit with two guides will nevertheless remain the same as a unit with one guide only which rotate twice as fast. However, the rate of travel of the guide on a unit which contains two such guides will be reduced from 53.4"/container to 26.7"/container. The maximum speed of these guides, for units with an output of 100 containers per minute, will therefor be reduced from 89"/sec. to 44.5"/ sec.

The speed of the supply conveyor will be reduced from 100" per second to 50" per second.

The speed of the discharge conveyor should be the same as the speed of the supply conveyor.

The transfer of the containers from the load cell to the discharge conveyor is performed with a unit which is similar to the first unit which transfers the containers from the supply conveyor to the load cell, except that the second unit must operate a discharge guide. However, as just noted, such a second unit cannot be used in conjunction with the first one, since it would be impossible to support the load cell between the two units, either from the bottom, the sides or the top, due to the movements of parts of the two units or the containers themselves.

Consequently, some other means, such as a plow, will be used to accomplish this transfer, under conditions which are as follows: the containers, which rest on the load cell, must be gently removed from their stationary position. Their speed must then be gradually accelerated to a speed somewhat below that of the discharge conveyor at the time of their transfer onto this conveyor.

Should only one plow be used for a machine with two guides, the time available for the plow, considering the need of it to start the removal of a container from the load cell after having come to a momentary stop, would be so short that it would increase the speed of the plow at the time it pushes the container onto the conveyor, well above the speed of the conveyor. The plow would, therefore, not only push the container onto the conveyor, but also right off it again.

Since it is necessary that the speed of the container is somewhat below that of the conveyor when it is pushed onto it, it will be necessary to use as many plows on each unit as guides are used.

The problem with two plows is that one of them has to come to its momentary stop prior to its start of the removal of the container from the load cell, while the other plow has to move at its maximum speed since it pushes at the same moment its container onto the discharge conveyor.

Figure 6:
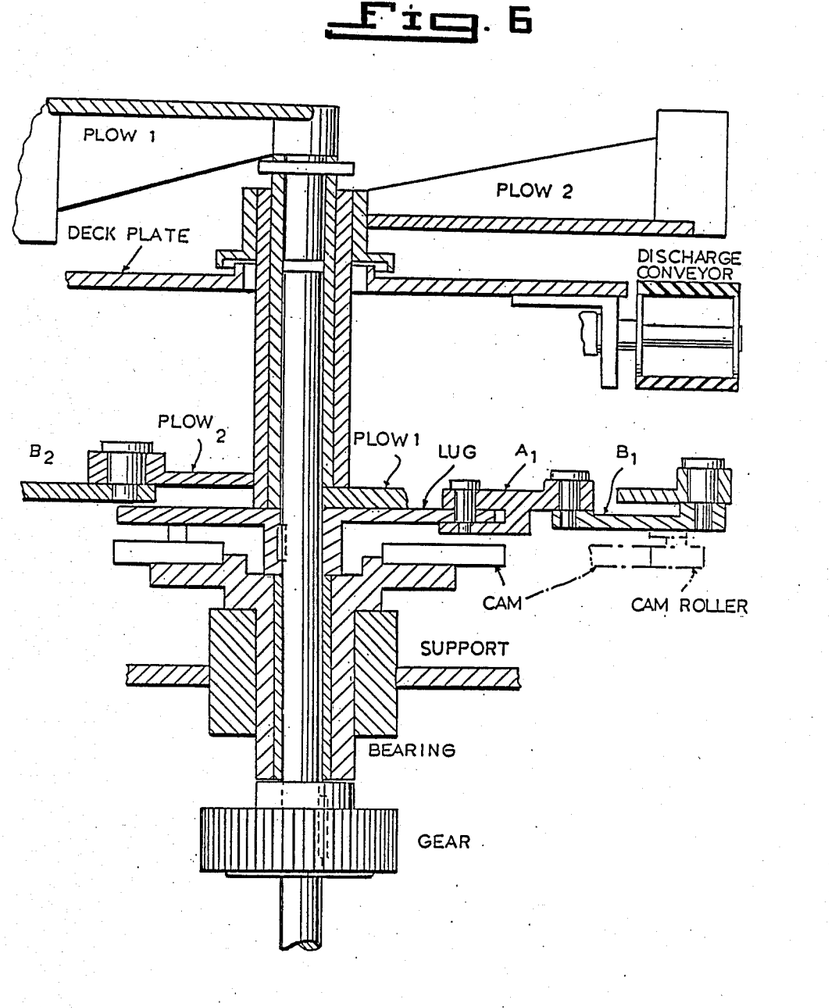
FIG. 6 is a schematic vertical sectional view of the plows supported on the drive shaft of FIG. 5.
Figure 7:
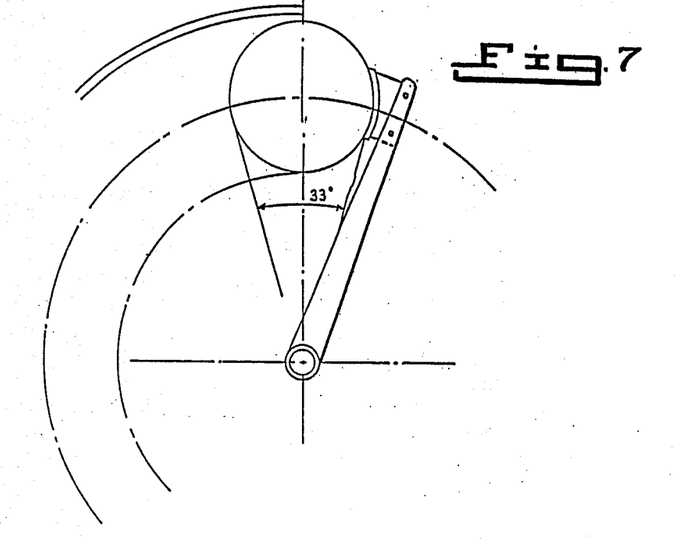
FIG. 7 is a schematic plan view of a plow atop a unit.
Figure 8:
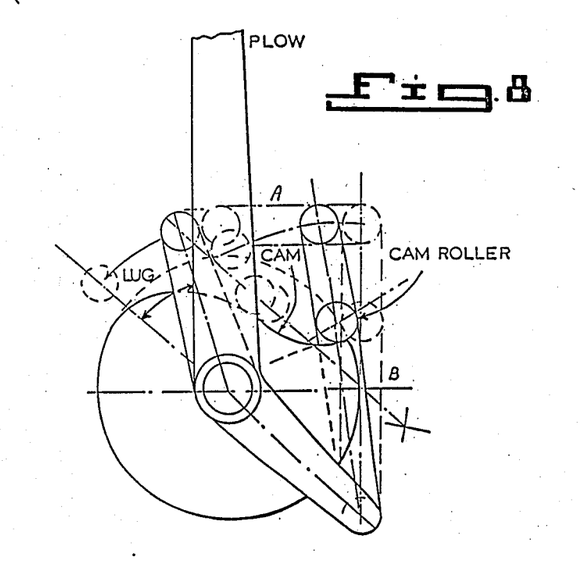
FIG. 8 is a schematic plan view showing the operating mechanisms (the lug, plow shaft, connecting rods, cam and cam roller) for the plow.
Figure 8B:
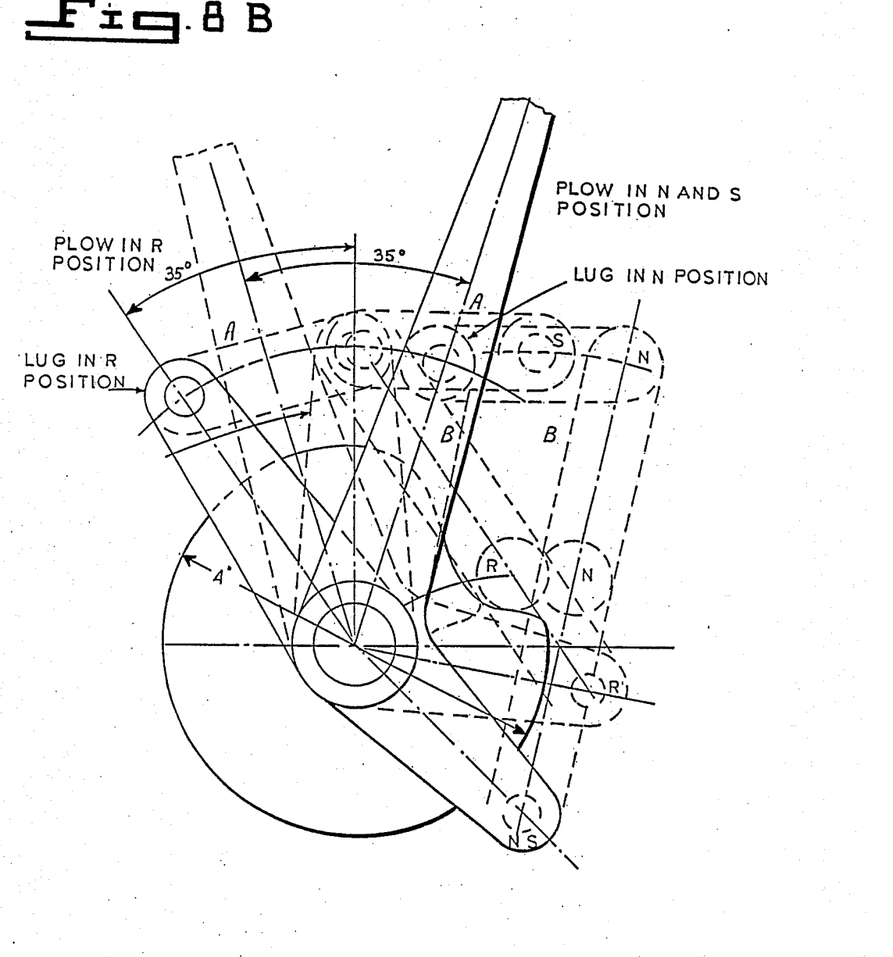
FIG. 8B is a schematic plan view showing the positions of the plow relative to the cam as it moves the container from the load cell.
Figure 9:
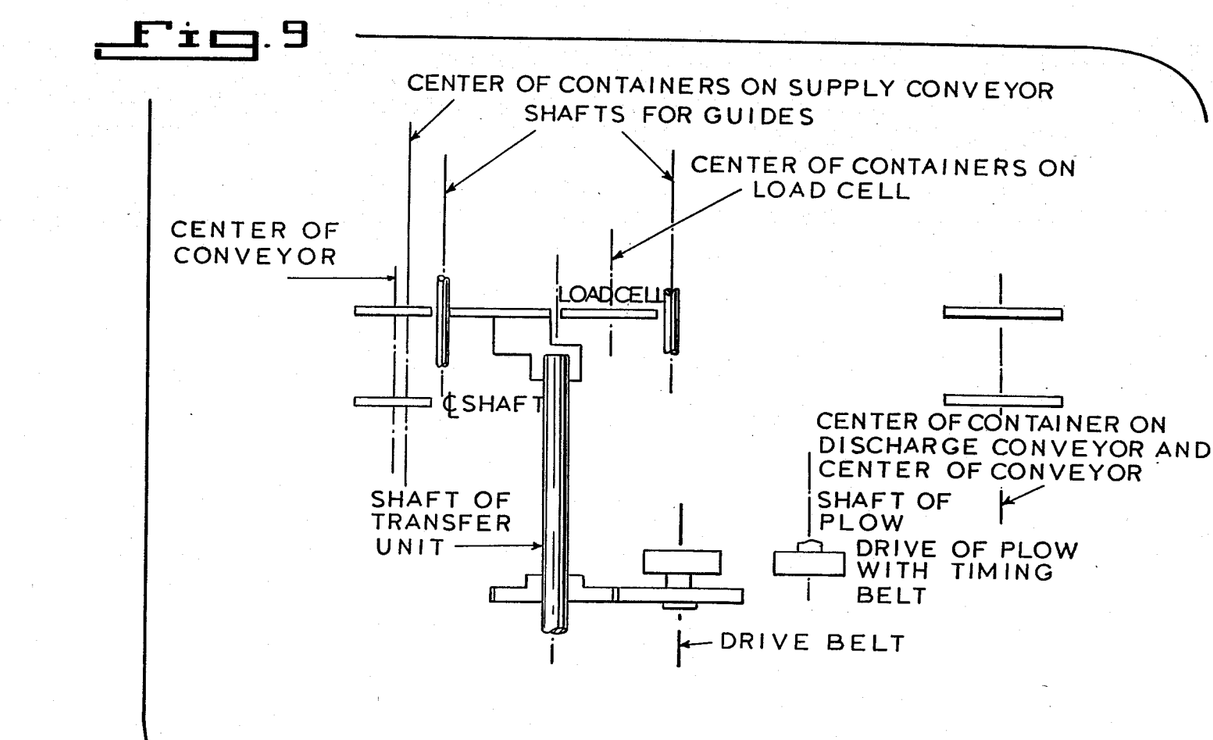
FIG. 9 is a schematic side elvation of the unit showing the dimensions between conveyors.

The device shown in FIG. 6 will operate the two (or more than two) plows in the required manner. The speed of the plows will be controlled by a cam (FIGS. 6, 8 and 8B). (Cams are normally used to control oscillating movements. This one is used to control continuously rotating ones.)

For a unit with gears G1 and G2 of 4 1/4" diameter and with a distance $R_6$ between the center of the shaft of the plow and its point of contact with the container, the average rate of travel of this contact point (and with it of the container) will be $2 \times R_6 \times TT/2$ per cycle of the plow.

With a discharge conveyor speed of 30" per cycle, the speed of the container at the time of its transfer onto this conveyor should be about the same as that of a discharge guide.

For $R_6 = 8"$, the maximum rate of travel of the container will be $2 \times 8 \times TT/2 = 25.12"$ per cycle.

Note: the deceleration of the plow to reduce its speed momentarily to zero and the subsequent acceleration of it, will be completed before the plow pushes the containers onto the discharge conveyor, so that its speed at that moment will be equal to the average speed.

What is claimed is:

1. Apparatus for weighing pieces delivered from a supply conveyor traveling at a predetermined speed and for delivering the weighed pieces to a pick-up conveyor; comprising at least one unit including at least one guide means for receiving a piece from the supply conveyor and for guiding the same to a weigh station, said guide means comprising a receiver shaped to guide the piece and link means for drawing the receiver and the guided piece at diminishing speeds from the supply conveyor to the station and means for removing the piece from the station to the pick-up conveyor, said removing means comprising a rotating plow and means driving said plow and piece to be removed from a stopped position adjacent the piece at the station at increasing speeds to the pick-up conveyor.

* * * * *